UNITED STATES PATENT OFFICE.

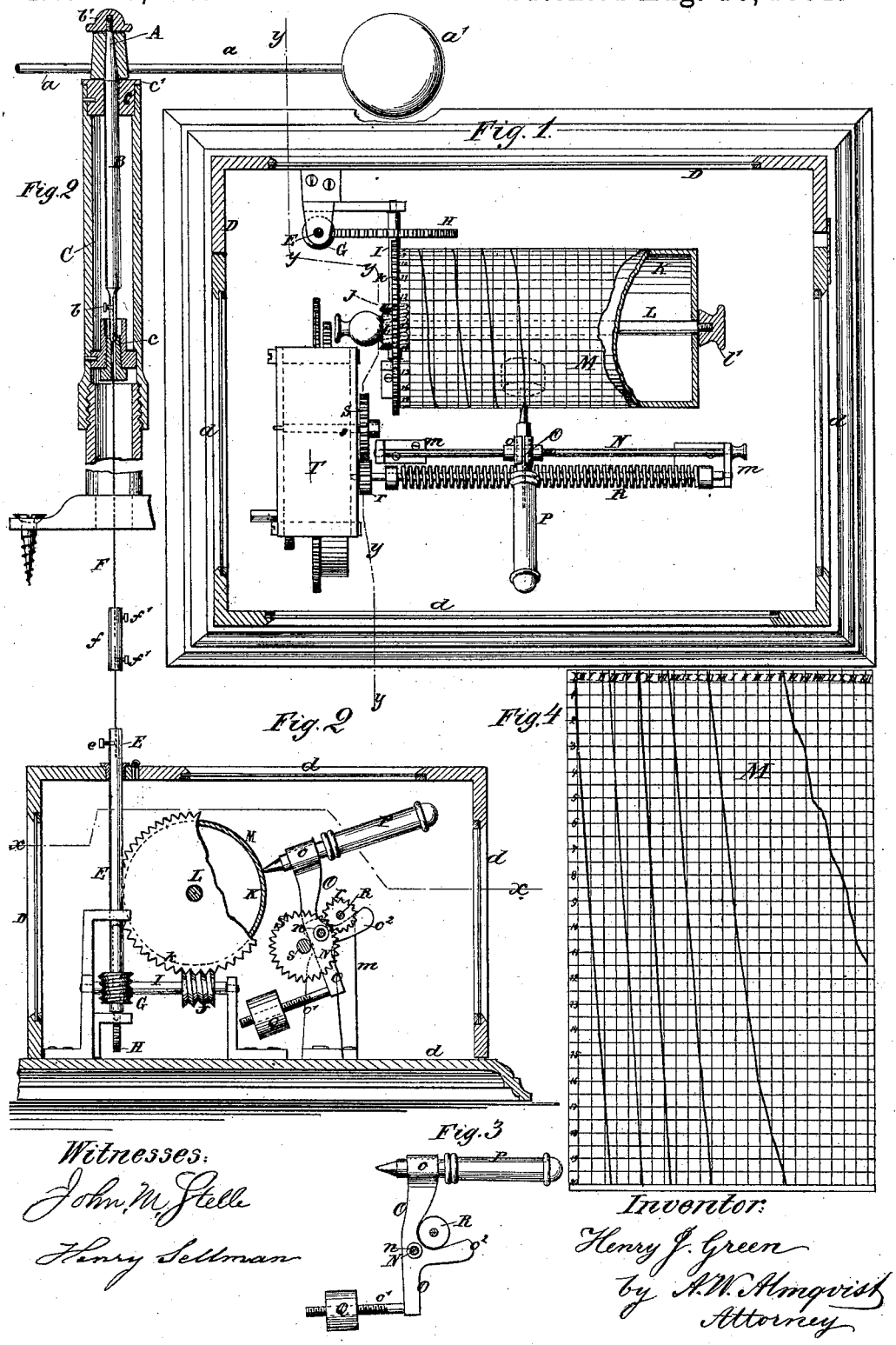

HENRY J. GREEN, OF BROOKLYN, NEW YORK.

RECORDING ANEMOMETER.

SPECIFICATION forming part of Letters Patent No. 245,625, dated August 16, 1881.

Application filed January 24, 1881. (No model.)

*To all whom it may concern:*

Be it known that I, HENRY J. GREEN, of Brooklyn, in the county of Kings and State of New York, have invented a new and useful Improvement in Self-Recording Anemometers, of which the following is a specification.

My invention relates to that class of anemometers in which hemispherical cups, fixed by rods to an upright shaft and revolved by the wind more or less rapidly, according to the force of the latter, and a clock-work operating in conjunction with the mechanism driven by the wind, are made to move a register-sheet and a drawing-point at right angles to each other, causing the drawing-point to mark by its path a diagram upon the surface of the receding register-sheet, and thus indicate on its scale the number of miles traveled by the wind in a certain space of time.

In similar instruments as heretofore constructed the revolving of the said cups and shaft continuously in the same direction is made to actuate the drawing-point, while the register-sheet is generally fastened upon a traveling board or carriage drawn along by the clock-work, the point being arranged to rise a certain distance (marking the diagram as it rises) and then to drop by gravity only, thus omitting to indicate while it falls, vibrates from the effect of the momentum acquired by the fall, and gradually settles at rest.

The object of my present invention is to furnish a simple, more portable, sensitive, and minutely accurate apparatus, in which the drawing-point, as well as the register-sheet, shall have its motion always in the same direction until the point shall have drawn a continuous diagram line throughout the whole scale on the sheet, the point and sheet always remaining in contact.

The invention consists in the combination of the various parts, constructed and arranged to operate as hereinafter described and claimed.

In the accompanying drawings, Figure 1 represents a plan view of my improved anemometer with its recording cylinder partly broken away, the case inclosing the instrument being shown in horizontal section taken on the line $x$ $x$ of Fig. 2. Fig. 2 is an end elevation of the same seen from a vertical section taken on the line $y$ $y$ of Fig. 1. Fig. 3 is a detail view explanatory of the manner of resetting the drawing-point when replacing the register-sheet. Fig. 4 is a face view of the register-sheet displayed to show a diagram as drawn by the instrument during a day, or twenty-four hours.

Like letters of reference indicate like parts in the several figures.

In the present case the wind is the primary motor of the register-sheet, the clock-work being the motor of the drawing-point.

A hub, A, provided with radial arms $a$, carrying the cups $a'$ of an ordinary Robinson anemometer, is fastened by an end nut, $b'$, upon the conical upper end of a shaft, B, so that the shaft will revolve when the wind acts upon the cups $a'$. The shaft B is protected within a tube or ordinary gas-pipe, C, provided with a foot for attaching it in an upright position upon the roof or other elevated place of the building or other structure in which the anemometer is put up for observation. The shaft is supported in a step, $c$, secured in the lower end of the tube C, and its upper part has its bearing in a plug or cap, $c'$, in the upper end of the tube.

The recording-instrument proper is inclosed in a case, D, provided with a hinged cover, $d$, an upright shaft, E, placed in line with the upper shaft, B, receiving the necessary motion from the latter shaft. For this purpose the lower end of the upper shaft, B, has an axial socket with a transverse set-screw, $b$, and the upper end of the lower shaft, E, has a similar socket and set-screw, $e$, and the two shafts are connected to revolve together as one by a fine wire, F, going through a central hole in the step $c$, and having its ends inserted in the said sockets and clamped therein by the said set-screws $b$ $e$. The shaft B being generally necessarily placed at a great distance above the shaft E, a shaft connection of such length and of the heretofore ordinary diameter adds by its weight a considerable amount of friction and consequent resistance to the force of the wind, and the difficulty of putting up the shafting in exactly the same perpendicular line necessitates the use of hinge-joints, or so-called "universal joints," to allow the shafts to revolve. The weight of the wire F is very slight (one ounce to ten feet of its length) and, being suspended from the shaft B, is entirely supported by the step $c$, and the wire is subjected only to the very small torsional strain due to frictional resistance of the shaft E, and, being pliable throughout, the wire easily transmits the rotary motion to the lower shaft, even though the shafts be not put up in exactly the same perpendicular line. When the height is greater than an ordinary wire-length two lengths of wire may be connected by inserting their ends in a small tube, $f$, and clamping them there by set-screws $f'$.

Upon the lower part of the shaft E is fitted or formed a so-called "worm" or screw-thread, G, which meshes in the teeth of a wheel, H, secured upon a horizontal shaft, I. Another worm, J, secured upon the shaft I meshes in the teeth of a wheel, $k$, which is fastened or formed upon one end of the recording drum or cylinder K. The latter is mounted to revolve upon a stationary shaft, L, secured at one end to an upright, $l$. The other end of the shaft L is free in order to allow of putting the cylinder on and taking it off from the shaft, and is threaded from its extreme end to a shoulder, against which a hand-nut, $l'$, fitting the said thread is tightened to retain the cylinder in working position upon the shaft L.

M is the register-sheet. This is ruled, as seen in Fig. 4, the spaces between the vertical lines (marked in Roman figures) indicating the hours of the day, each space tween two adjacent horizontal lines indicating a velocity of one-half mile, and between every other line (marked in Arabic figures) a velocity equal to one mile. The upper and lower edges of the sheet are pasted together to form of the paper a tube exactly fitting the surface of the recording-cylinder, the two sets of worm-gear G H and J $k$ being so proportioned that the cylinder will revolve through a space equal to the distance between two adjacent horizontal numbered lines for each mile traversed by the wind.

Parallel with the shaft L and at suitable distance apart are mounted, in uprights $m$, a stationary guide-rod, N, and a revolving screw, R, the latter being provided with an end wheel, $r$, gearing with a wheel, S, fastened upon the same arbor, $s$, as the minute-hand of an ordinary clock-work, T. As the minute-wheel S makes one revolution in one hour, the screw also would make one revolution if the wheel $r$ were of the same size as the wheel S. In that case the pitch of the screw R should be equal to the distance between two adjacent vertical division-lines on the register-sheet M. In the drawings, the pitch of the said screw is equal to one-half of the said distance and makes just two revolutions in one hour, the diameter of the wheel $r$ being just one-half of the diameter of the wheel S.

The drawing-point P (preferably a stylographic pen) is held in a spring-clamp, $o$, formed upon the upper end of a small upright bracket, O, which is provided at about its middle with a horizontal sleeve, $n$, by which it is supported to slide upon the guide-rod N. The lower end of the bracket O has a threaded arm, $o'$, attached, which projects toward the recording-cylinder at about a right angle to the main direction of the bracket. A threaded weight, Q, movable as a nut upon the threaded arm $o'$, affords and regulates the proper pressure with which the point of the pen P should bear against the surface of the register-sheet M upon the recording-cylinder K. The bracket N has also an arm, $o^2$, projecting from it beneath and toward the screw R, and of suitable thickness to fit without binding in the space between two threads of the screw. The upper edge of the projection $o^2$ must not be allowed to come in contact with the bottom of the thread, as in that case it would stop the descent of the weight Q, and thus prevent proper contact between the pen and the register-sheet. As the screw R revolves its thread, acting upon the side of the projection $o^2$, carries the latter along by its pitch, causing the bracket O to slide on the guide-rod N and the pen P to mark its path on the register-sheet uniformly at the rate of one space an hour, while the surface of the recording-cylinder recedes at a rate depending entirely on the velocity of the wind, through the space of a fraction, or the whole, or a multiple of its circumference, thus producing on the register-sheet a continuous diagram-line, as illustrated in the drawings. At the end of twenty-four hours the pen P is raised from the paper in the position shown in Fig. 3, bringing the bracket out of contact with the screw R, and the bracket O is slid back by hand to its starting-point on the rod N. The nut $l'$ is then removed, the cylinder K slipped off the shaft L, the register-sheet removed and replaced by another, and the recording-cylinder again attached in working position, the pen P being started on the division-line in the sheet which corresponds to the time by the clock. The cylindrical paper-register M, containing the diagram-record of the anemometer for the then past twenty-four hours, is then cut open, as in Fig. 4, and thus placed, in sheet form, on file for reference.

Having thus described my invention, what I claim as new, and desire to secure by Letters Patent, is—

The adjustably-weighted pen-holding bracket O, arranged to slide upon the guide N, and having a projection, $o^2$, which enters the thread of the screw R when the pen is in contact with the register-sheet, and which is brought out of the thread by raising the pen from the sheet, to allow of sliding the bracket back to its starting-point on the guide, substantially as specified.

HENRY J. GREEN.

Witnesses:
A. W. ALMQVIST,
JOHN M. STELLE.